(12) United States Patent
Matsue et al.

(10) Patent No.: US 9,575,468 B2
(45) Date of Patent: Feb. 21, 2017

(54) SATELLITE RADIO SIGNAL RECEIVER, ELECTRONIC TIMEPIECE, DATE AND TIME INFORMATION ACQUIRING METHOD AND RECORDING MEDIUM

(71) Applicant: CASIO COMPUTER CO., LTD., Tokyo (JP)

(72) Inventors: Takeshi Matsue, Kokubunji (JP); Hideo Abe, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/072,632

(22) Filed: Mar. 17, 2016

(65) Prior Publication Data

US 2016/0370769 A1 Dec. 22, 2016

(30) Foreign Application Priority Data

Jun. 18, 2015 (JP) ................................. 2015-122656

(51) Int. Cl.
*G04R 20/06* (2013.01)
*G01S 19/25* (2010.01)
(Continued)

(52) U.S. Cl.
CPC ............... *G04R 20/04* (2013.01); *G01S 19/14* (2013.01); *G01S 19/256* (2013.01); *G04R 20/06* (2013.01)

(58) Field of Classification Search
CPC ......... G04R 20/00; G04R 20/02; G04R 20/04; G04R 20/06; G01S 19/14; G01S 19/25; G01S 19/256
See application file for complete search history.

(56) References Cited

U.S. PATENT DOCUMENTS

| | | | | |
|---|---|---|---|---|
| 5,798,732 | A | * | 8/1998 | Eshenbach ............ G01S 19/243 342/352 |
| 7,649,812 | B2 | * | 1/2010 | Baba ....................... G01S 19/34 342/357.48 |

(Continued)

FOREIGN PATENT DOCUMENTS

| | | |
|---|---|---|
| JP | H11-223686 A | 8/1999 |
| JP | 2009-036748 A | 2/2009 |
| JP | 2009-053182 A | 3/2009 |

OTHER PUBLICATIONS

Notification of Reasons for Refusal dated Dec. 13, 2016 received in Japanese Patent Application No. JP 2015-122656 together with an English language translation.

*Primary Examiner* — Vit W Miska
(74) *Attorney, Agent, or Firm* — Scully, Scott, Murphy & Presser, P.C.

(57) ABSTRACT

A satellite radio signal receiver includes a receiving section and a processor. The receiving section receives a radio signal from a satellite and demodulates the signal to identify each received bit of the signal. The processor compares the identified received bit with estimated bits which are estimated to be received within a possible deviation range set for a current date and time acquired as a reception time of the received bit, so as to obtain information on comparison result in relation to a deviation from the current date and time. The processor detects the deviation which satisfies a predetermined match condition of comparison results for received bits. The processor acquires date and time information based on the detected deviation which satisfies the predetermined match condition.

20 Claims, 10 Drawing Sheets

(51) Int. Cl.
    *G04R 20/04*     (2013.01)
    *G01S 19/14*     (2010.01)

(56) References Cited

U.S. PATENT DOCUMENTS

| | | | |
|---|---|---|---|
| 2003/0198140 A1* | 10/2003 | Shimizu | G04G 3/02 368/47 |
| 2008/0074950 A1* | 3/2008 | Rostrom | G01S 19/24 368/10 |
| 2009/0248357 A1* | 10/2009 | Abe | G04R 20/10 702/176 |
| 2012/0051191 A1* | 3/2012 | Fujisawa | G04C 9/02 368/47 |
| 2015/0168924 A1* | 6/2015 | Kato | G04R 20/04 368/47 |
| 2015/0212495 A1* | 7/2015 | Kato | G04R 20/04 368/47 |
| 2016/0025859 A1* | 1/2016 | Basnayake | G04R 20/06 342/357.62 |

* cited by examiner

FIG.2
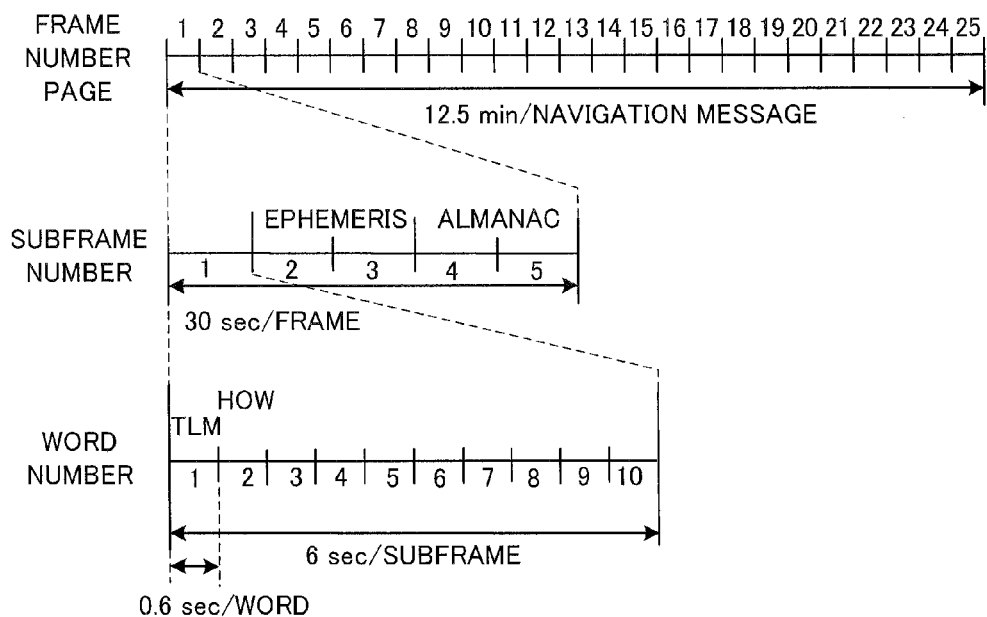
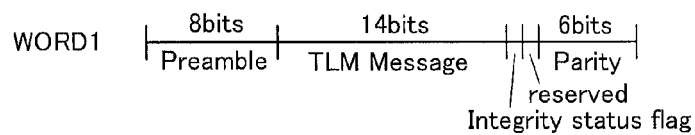
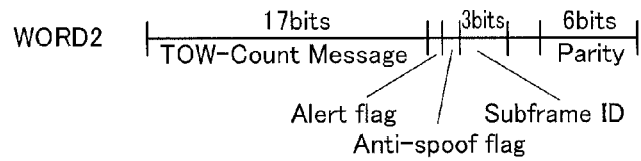
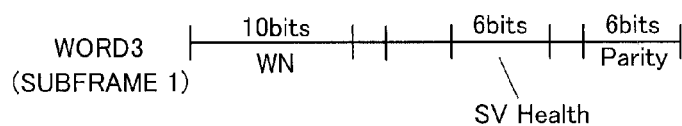

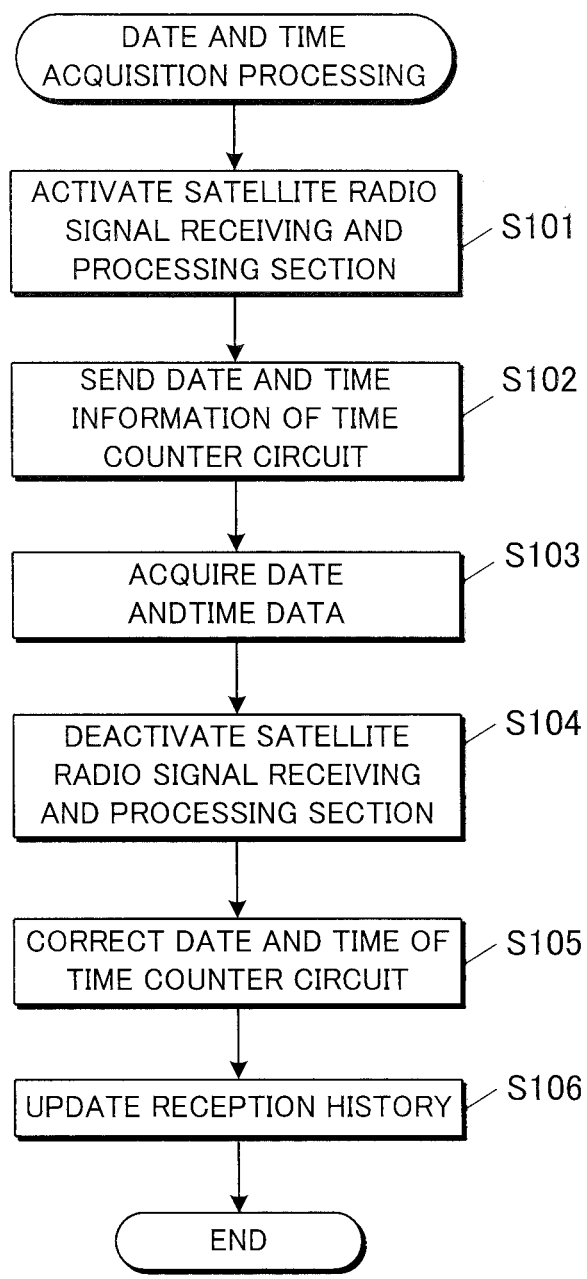

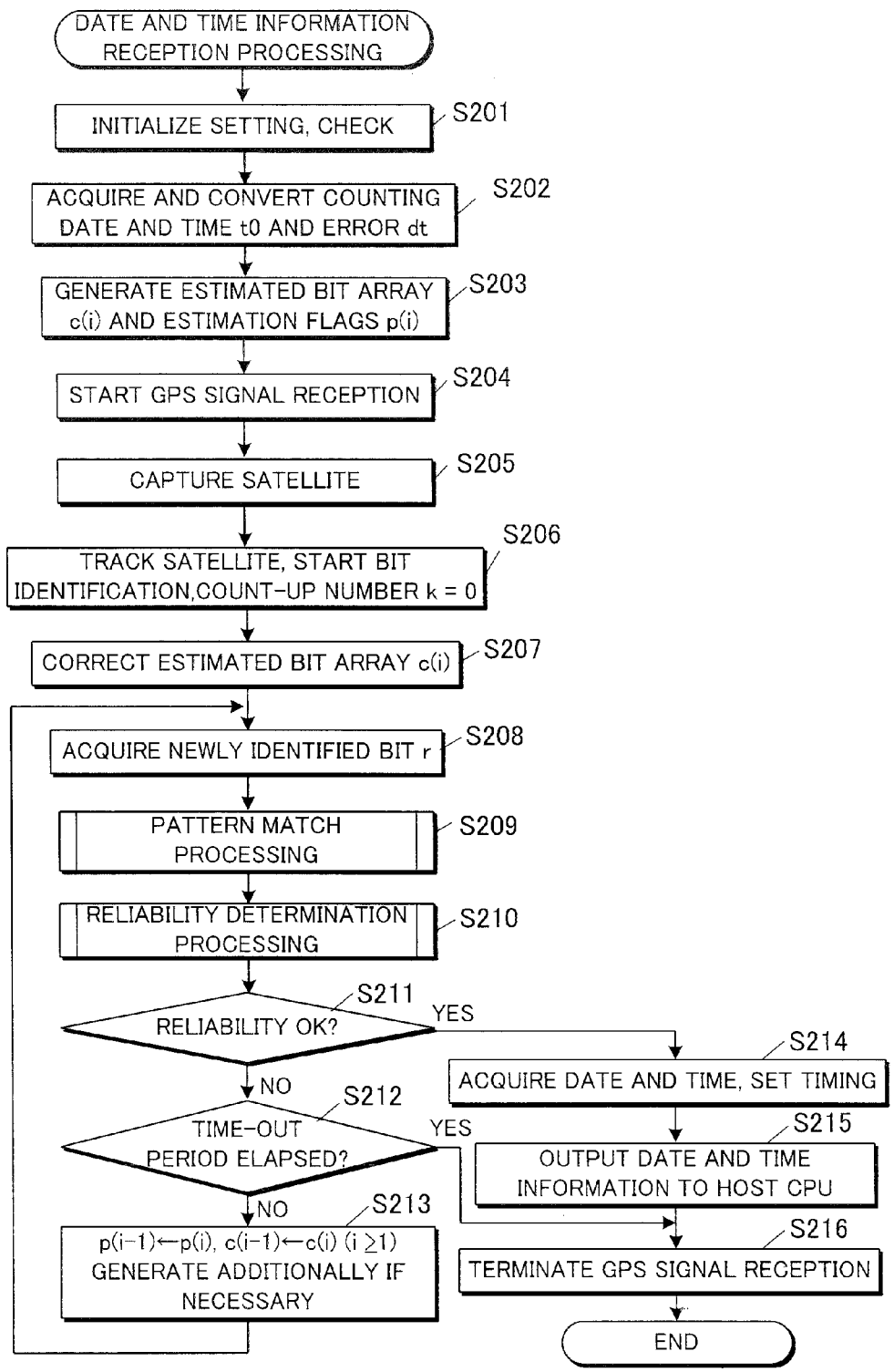

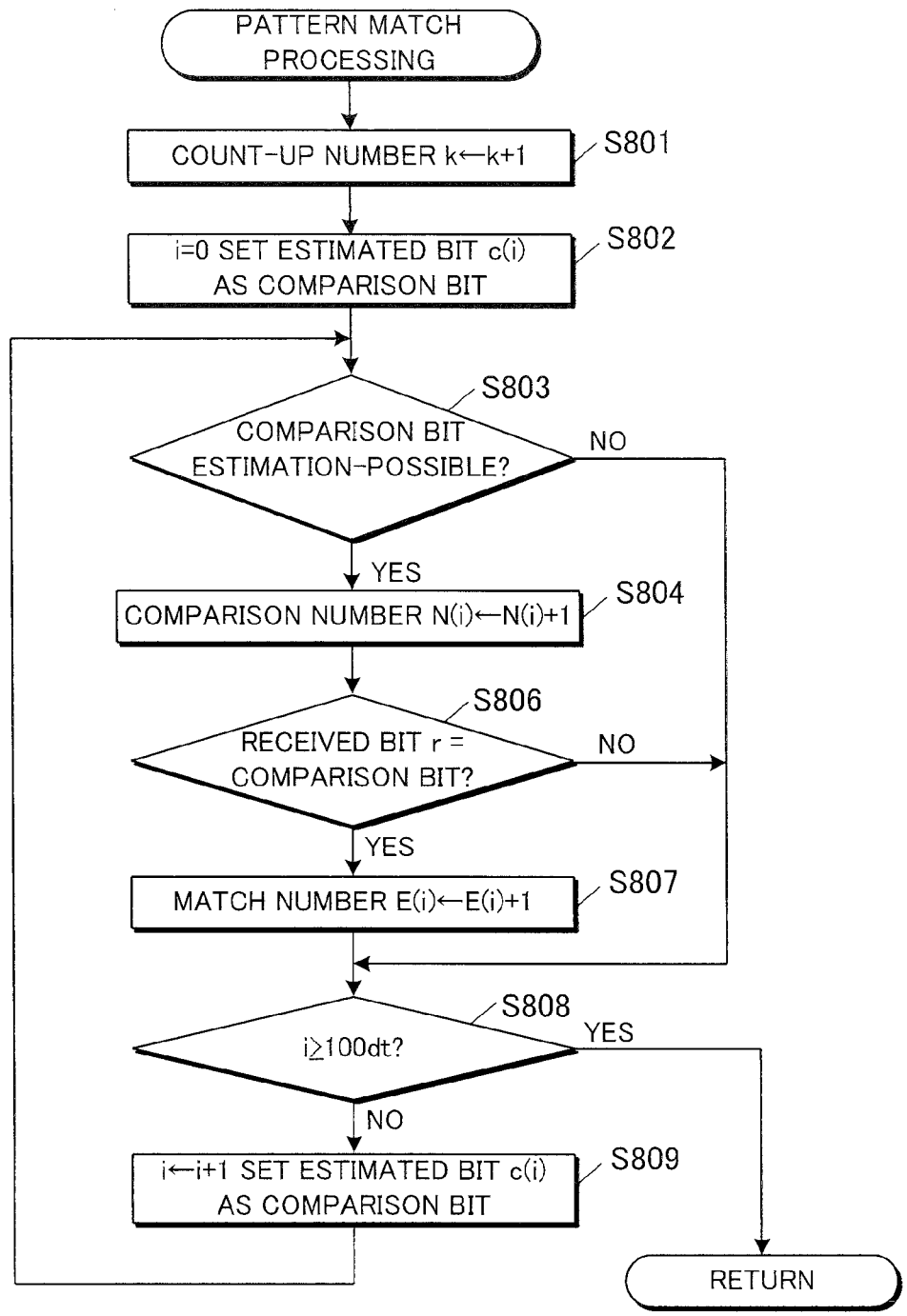

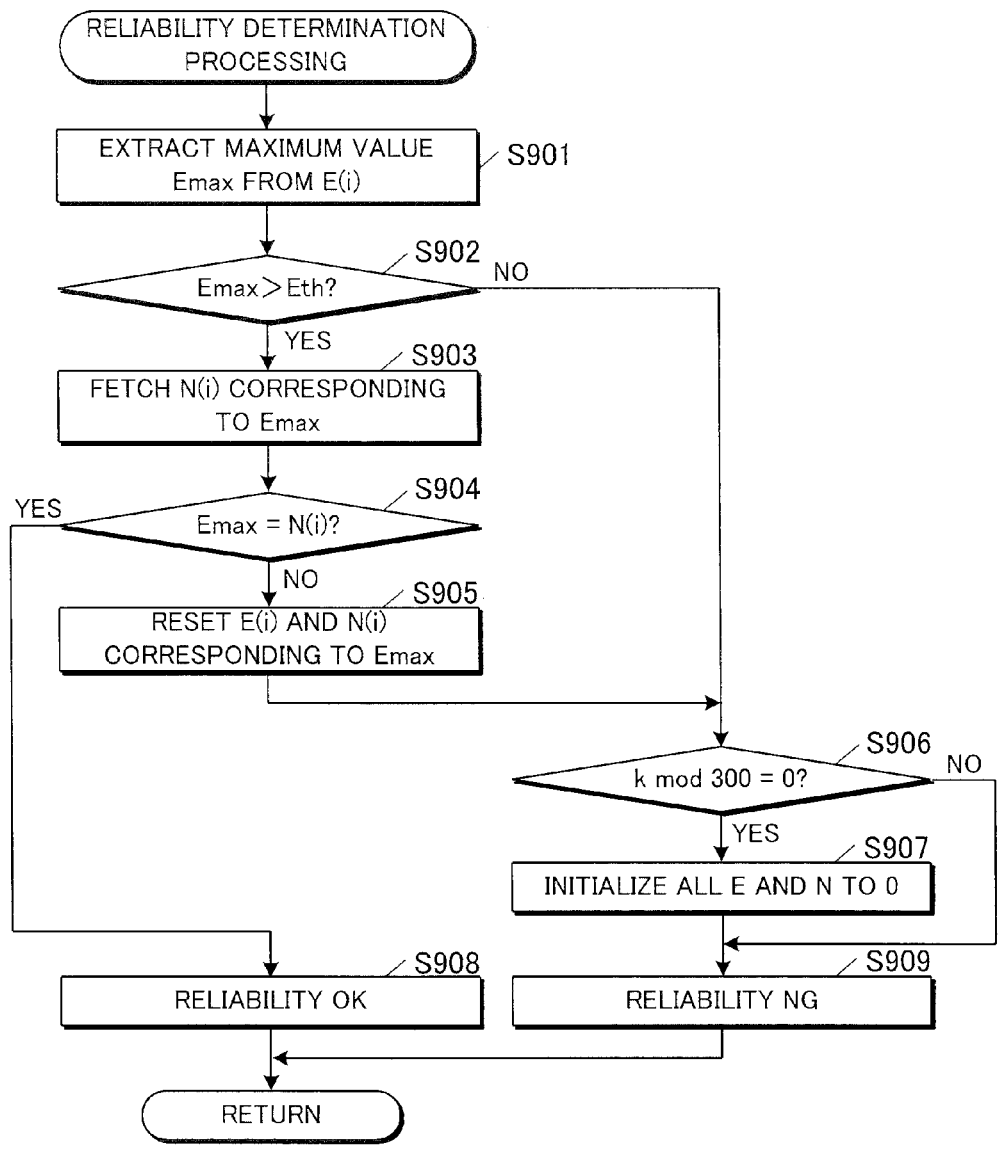

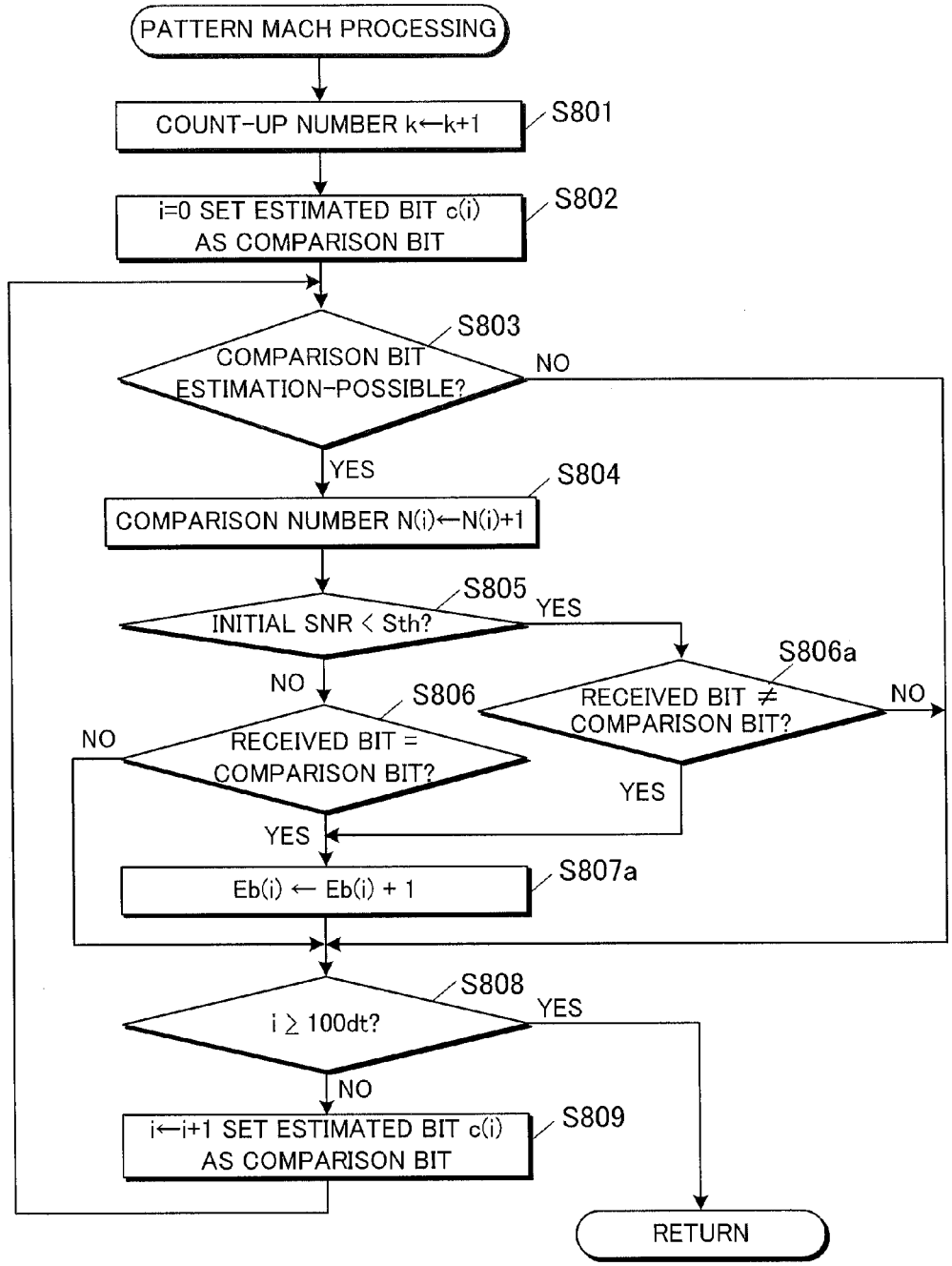

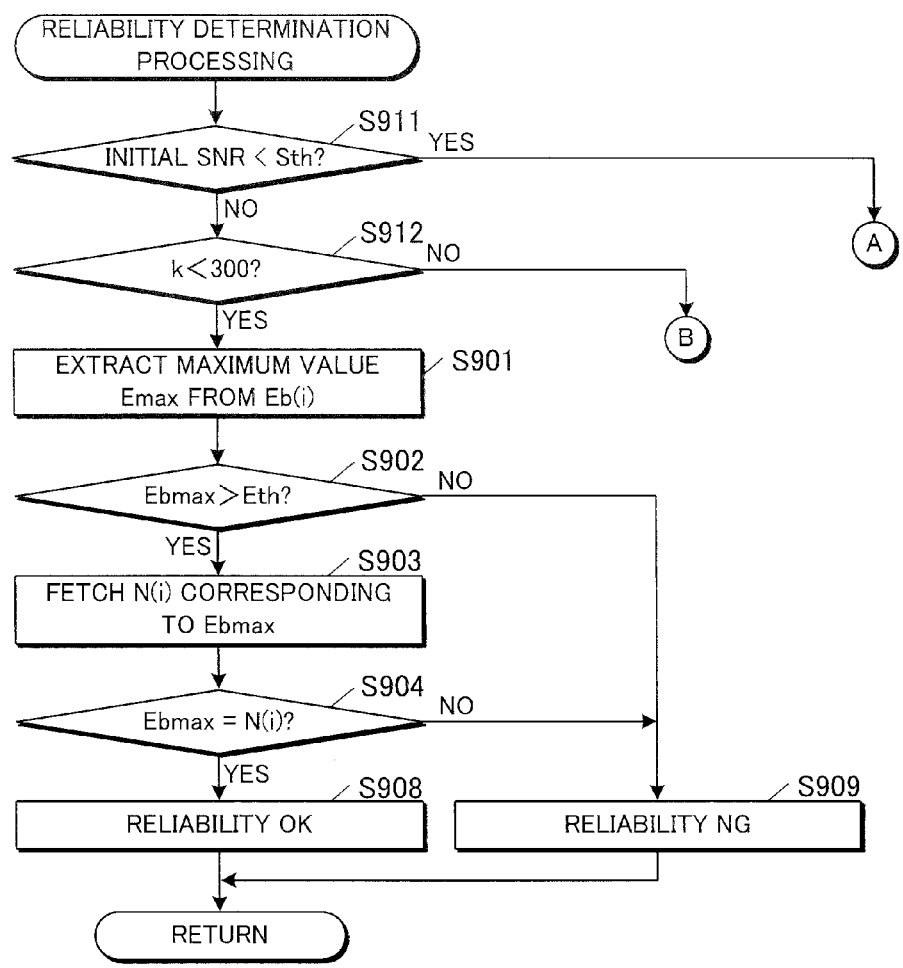

SATELLITE RADIO SIGNAL RECEIVER, ELECTRONIC TIMEPIECE, DATE AND TIME INFORMATION ACQUIRING METHOD AND RECORDING MEDIUM

CROSS REFERENCE TO RELATED APPLICATION

This application is based upon and claims the benefit of priority under 35 USC 119 of Japanese Patent Application No. 2015-122656 filed on Jun. 18, 2015, the entire disclosure of which, including the description, claims, drawings and abstract, is incorporated herein by reference in its entirety.

BACKGROUND OF THE INVENTION

1. Field of the Invention

The present invention relates to satellite radio signal receiver that receives a radio signal from a positioning satellite to acquire date and time information, an electronic timepiece, a date and time information acquiring method and a recording medium.

2. Description of Related Art

There have been electronic timepieces (radio timepieces) that have a function of keeping their counting time correct by receiving a radio signal from a navigation satellite (positioning satellite) of the GNSS (Global Navigation Satellite System) and acquiring date and time information. Such radio timepieces do not require a user manual operation and can keep the counting and displaying date and time correct all over the world.

However, receiving a satellite radio signal places a load much greater than that of counting or displaying the date and time in an electronic timepiece. Accordingly, a problem with such radio timepieces is that a function of receiving a satellite radio signal requires a large battery, which results in the increased size and weight of the electronic timepiece. To cope with the problem, a variety of techniques for reducing power consumption have been developed.

One of such techniques for reducing power consumption is to reduce the reception time of a radio signal. For example, JP 2009-36748A, which is a Japanese patent document, discloses a technique of synchronizing signal reception with signal transmission of a predetermined part including the date and time information according to the format of the signal (navigation message) transmitted from GPS satellites. The signal reception is suspended while unnecessary information is being sent. At the time of the signal reception, to avoid false identification of the date and time, a parity data of the block including the predetermined part is acquired so that the integrity of the received data is checked.

However, decoding the date and time after identifying the code and then further performing a verification such as a parity check increases the processing load during the signal reception. Accordingly, a problem is that such techniques are likely to result in an increase in processing load and power consumption.

SUMMARY OF THE INVENTION

It is an object of the present invention to provide a satellite radio signal receiver that can acquire correct date and time information while the processing load and the power consumption are suitably reduced, an electronic timepiece, a date and time information acquiring method and a recording medium.

In order to realize the above object, according to a first aspect of the present invention, there is provided a satellite radio signal receiver, including:

a receiving section which receives a radio signal from a satellite and demodulates the signal to identify each received bit of the signal; and a processor;

wherein the processor compares the identified received bit with estimated bits which are estimated to be received within a possible deviation range set for a current date and time acquired as a reception time of the received bit, so as to obtain information on comparison result in relation to a deviation from the current date and time, wherein the processor detects the deviation which satisfies a predetermined match condition of comparison results for received bits, and wherein the processor acquires date and time information based on the detected deviation which satisfies the predetermined match condition.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 2 illustrates the format of a navigation message transmitted from GPS satellites;

FIG. 4 is a flowchart of the control steps of date and time acquisition processing;

FIG. 5 is a flowchart of the control steps of date and time information reception processing;

FIG. 6 is a flowchart of the control steps of pattern match processing that is called in the date and time information reception processing;

FIG. 7 is a flowchart of the control steps of reliability determination processing that is called in the date and time information reception processing;

FIG. 8 is a flowchart of the control steps of pattern match processing that is called in date and time information reception processing of a variation;

FIG. 9 is a flowchart of the control steps of reliability determination processing that is called in the date and time information reception processing of the variation.

DETAILED DESCRIPTION OF THE PREFERRED EMBODIMENT

Figure 1:
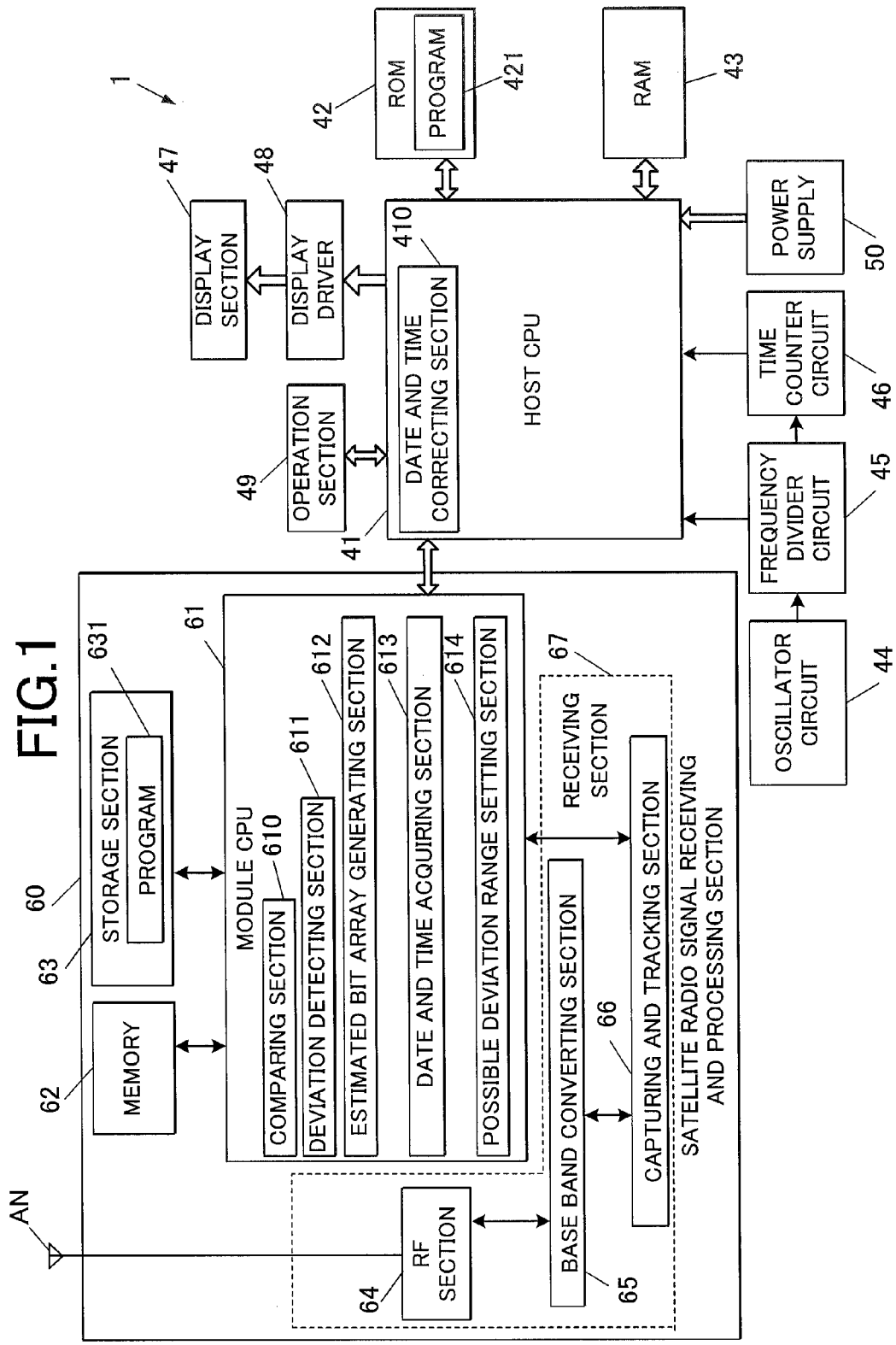
FIG. 1 is a block diagram of an electronic timepiece according to an embodiment of the present invention.

Hereinafter, an embodiment of the present invention will be described referring to the drawings. Though various technical limitations which are preferable to perform the present invention are included in the after-mentioned embodiment, the scope of the invention is not limited to the following embodiment and the illustrated examples.

FIG. 1 is a block diagram illustrating the functional configuration of an electronic timepiece 1, which is an embodiment of the satellite radio signal receiver or the electronic timepiece of the present invention.

The electronic timepiece 1 is capable of receiving and demodulating a radio signal at least from a positioning satellite (hereinafter referred to as a GPS satellite) of the GPS (Global Positioning System) of the United States and acquiring date and time information.

The electronic timepiece 1 includes a host CPU (central processing unit) 41 (data and time correcting section 410) as an electronic timepiece processor, a ROM (read only memory) 42, a RAM (random access memory) 43, an oscillator circuit 44, a frequency divider circuit 45, a time counter circuit 46 as a time counting section, a display section 47, a display driver 48, an operation section 49, a power supply 50, a satellite radio signal receiving and processing section 60 as a satellite radio signal receiver, an antenna AN and the like.

The host CPU 41 performs a variety of processing so as to integrally control the overall operation of the electronic timepiece 1. The host CPU 41 reads out a control program from the ROM 42 and loads it on the RAM 43 so as to perform a variety of processing, e.g. displaying the date and time, computing and displaying related to various functions and the like. Further, the host CPU 41 controls the satellite radio signal receiving and processing section 60 to receive a radio signal from a positioning satellite, so as to acquire required date and time information and position information from the received signal.

The ROM 42, which is constituted by a mask ROM, a rewritable non-volatile memory or the like, stores the control program, a default setting data and the like. The control program includes a program 421 that is used for the control of a variety of processing for acquiring a variety of information from a positioning satellite.

The RAM 43, which is constituted by a volatile memory such as a SRAM and a DRAM, stores temporary data to provide a workspace for the host CPU 41 and also stores a variety of setting data. Such setting data includes hometown setting, summer time setting in counting and displaying the date and time and the like of the electronic timepiece 1. A part or all of the setting data may be stored in a non-volatile memory instead of the RAM 43.

The oscillator circuit 44 generates and outputs a predefined frequency signal. The oscillator circuit 44 is constituted by, for example, a quartz oscillator.

The frequency divider circuit 45 divides the frequency signal input from the oscillator circuit 44 into signals with a frequency that can be used in the time counter circuit 46 and the host CPU 41, and output the signals to them. The frequency of the output signals may be variable according to a setting by the host CPU 41.

The time counter circuit 46 counts the number of predetermined frequency signals (clock signals) input from the frequency divider circuit 45 and adds the counted number to an initial value so as to count the current date and time. The time counter circuit 46 may either be constituted as software that changes a value stored in an RAM or include a dedicated counter circuit. The date and time counted by the time counter circuit 46 may be any one of the elapsed time from a predetermined time point, the UTC (Coordinated Universal Time), the date and time of a preset hometown (local time) and the like, but is not particularly limited thereto. The date and time counted by the time counter circuit 46 is not necessarily held in the form of year-month-day and hour-minute-second. The clock signals input from the frequency divider circuit 45 to the time counter circuit 46 is slightly deviated from the correct lapse of time, and the deviation length per day (rate of clock) varies depending on the operation environment such as temperature, and is typically within the range ±0.5 sec.

The display section 47 includes, for example, a display such as a liquid crystal display (LCD) and an organic EL (electro-luminescent) display. The display section 47 digitally displays the date and time and screen images related to various functions in the form of a dot matrix or segments or a combination thereof.

The display driver 48 outputs a drive signal to the display section 47 according to the type of the display based on a control signal from the host CPU 41 so as to display a screen image on the display.

The display section 47 may include an analog display in which a pointer (hand) or the like turns by a stepping motor or the like. In this case, a driver circuit for the stepping motor is provided as the display driver 48.

The operation section 49 receives a user operation and outputs an electric signal according to the input user operation to the host CPU 41 as an input signal. The operation section 49 includes, for example, a push-button switch, a crown switch and the like.

Alternatively or additionally, a touch sensor may be overlapped on the display of the display section 47 so that the display serves as a touch panel that outputs an operation signal according to the location and manner of a user touch operation detected by the touch sensor. In this case, the display section 47 and the operation section 49 may be integrally formed with each other.

The power supply 50, which includes a battery, supplies electric power required for the operation of the electronic timepiece 1 to each component at a predetermined voltage. In this embodiment, the battery of the power supply 50 is constituted by a solar panel and a secondary battery. The solar panel generates electric power from incident light and supplies the electric power to the components such as the host CPU 41. When an excess electric power is generated, it is stored in the secondary battery. On the contrary, when the electric power that the solar panel generates from incident light from the outside is not sufficient relative to the power consumption, an electric power is supplied from the secondary battery. Alternatively, a primary battery such as a button battery may be used as the battery.

The satellite radio signal receiving and processing section 60 receives a radio signal from a positioning satellite by tuning the antenna AN to the radio signal to identify and catch the C/A code (pseudo random noise) that is unique to the positioning satellite. The satellite radio signal receiving and processing section 60 then demodulates and decodes it to a navigation message transmitted from the positioning satellite and thereby acquires necessary information. The satellite radio signal receiving and processing section 60 includes a module CPU 61 as a processor (comparing section 610, a deviation detecting section 611, an estimated bit array generating section 612, a date and time acquiring section 613, a possible deviation range setting section 614), a memory 62, a storage section 63, a receiving section 67, and the like.

The module CPU 61 controls the satellite radio signal receiving and processing section 60 according to a control signal from the host CPU 41, an input of the setting data, and the like. The module CPU 61 reads out a necessary program and setting data from the storage section 63 to operate an RF section 64, a base band converting section 65 and a capturing and tracking section 66. The module CPU 61 thereby receives and demodulates a radio signal from a positioning satellite so as to acquire the date and time information. In addition to decoding a received radio signal to acquire the date and time information, the module CPU 61 can also compare a demodulated received bit array with a preset bit array for comparison (comparison bit array) without decoding the signal so as to detect match or mismatch between them.

The memory 62 is constituted by a RAM that provides a workspace for the module CPU 61 of the satellite radio signal receiving and processing section 60. Further, the memory 62 temporary stores a bit array data that is generated for comparison with a received bit array.

The storage section 63 stores various setting data related to GPS positioning and the history of positioning and date and time information acquisition. The storage section 63 is constituted by a non-volatile memory of any type such as a flash memory and an EEPROM (electrically erasable and programmable read only memory). Data that are stored in the storage section 63 include precise orbit information (ephemeris) and estimated orbit information (almanac) of each positioning satellite, the date and time and the position acquired in the last positioning, and the like. The storage section 63 further stores data of time zones and utilization of summer time around the world as a time difference table. When positioning is performed, the time difference table is referenced so that the local time information at the current location, such as the time difference of the standard time from the Coordinate Universal Time (UTC) and utilization of summer time, is specified.

Further, the storage section 63 stores a program for positioning and specifying the local time information and a program 631 for receiving and acquiring the date and time information, which are read out and executed by the module CPU 61.

The receiving section 67 includes the RF section 64, the base band converting section 65, the capturing and tracking section 66 and the like.

The RF section 64 receives a satellite radio signal at the L1 band (1.57542 GHz in GPS satellites) and selectively passes and amplifies the signal from a positioning satellite to convert it to an intermediate frequency signal. The RF section 64 includes an LNA (low noise amplifier), a BPF (band-pass filter), a local oscillator, a mixer and the like.

The base band converting section 65 applies the C/A code of the positioning satellite to the intermediate frequency signal obtained by the RF section 64 so as to acquire a base band signal, i.e. a bit array (received bit array) of the navigation message (predetermined format).

The capturing and tracking section 66 calculates correlation values of the C/A codes at different phases of the respective positioning satellites with respect to the intermediate frequency signal obtained by the RF section 64. The capturing tracking section 66 thereby specifies the peak of the correlation values so as to identify the received signal from the positioning satellite and the phase of the received signal. Further, in order to successively obtain a bit array of the navigation message from the positioning satellite by using the identified C/A code and the phase thereof of the positioning satellite, the capturing and tracking section 66 performs feedback of the phase information to the base band converting section 65 and the like and demodulates the received radio signal to identify the bits (received bits).

The satellite radio signal receiving and processing section 60 is supplied with electric power directly from the power supply 50, and the host CPU 41 switches it. That is, except for the time while the satellite radio signal receiving and processing section 60 receives a radio signal from a positioning satellite or performs the calculation for date and time acquisition and positioning, the power thereof is off independently from the always-on host CPU 41.

Next, the format of a navigation message transmitted from a GPS satellite will be described.

In the GNSS, positioning satellites are dispersed on orbits so that transmitted radio signals from different positioning satellites can be simultaneously received at any point on the ground. By acquiring information on the current position of a positioning satellite and the date and time information from at least four positioning satellites (at least three satellites when the position to be determined is assumed to be at the ground level) among the positioning satellites that transmit a receivable signal, it becomes possible to determine the position coordinate in a three-dimensional space and the date and time based on the acquired data and the deviations of the acquisition times, i.e. the differences in propagation time (distance) between the positioning satellites. By acquiring the date and time information from a single positioning satellite, it becomes possible to acquire the current date and time within an error (approximately less than 100 msec) corresponding to the propagation time from the positioning satellite.

Positioning satellites transmit a bit array (navigation message) that represents information on the date and time, information on the position of a satellite, status information such as health status of a satellite and the like, which is transmitted in the form of a spread spectrum generated by phase modulation with the C/A code (pseudo random noise). Each positioning system defines its own signal transmission format (the format of a navigation message).

FIG. 2 illustrates the format of a navigation message transmitted from a GPS satellite.

In the GPS, each GPS satellite transmits 25 pages of frame data each having a length of 30 seconds. Accordingly, a full set of data is output every 12.5 minutes. The GPS uses C/A codes that are unique to each GPS satellite. Each C/A code consists of an array of 1023 fragments (chips) and is repeatedly transmitted every 1 msec at a frequency of 1.023 MHz. Since the start of each chip is synchronized with an internal clock of a GPS satellite, detecting the deviation from the phase of a GPS satellite means detecting the propagation time, i.e. the phase deviation (pseudo range, distance index) corresponding to the distance from the GPS satellite to the present position.

Each frame data consists of five subframes (each having a length of 6 seconds). Further, each subframe consists of 10 words (each having a length of 0.6 sec, referred to as Word 1 to Word 10 in order). Each word consists of 30 bits. That is, 50 bits are transmitted per second. The data format of Word 1 and Word 2 are the same in all subframes. Word 1 contains the Preamble of an 8-bit fixed bit array followed by the 14-bit Telemetry Message (TLM Message), and thereafter further contains the 1-bit Integrity Status Flag, a 1-bit spare bit and 6-bit parity data in the written order. Word 2 contains the 17-bit TOW-Count (also referred to as the Z-Count) representing the elapsed time in a week followed by the Alert Flag and the Ant-Spoof Flag each composed of a single bit. Subsequently, Word 2 further contains the 3-bit subframe-ID representing the subframe number (cycle number), two parity data matching bits and the 6-bit Parity data in the written order.

The data of Word 3 or later differs according to the subframes. Word 3 of Subframe 1 contains the 10-bit WN (week number) at the head. Subframe 2 and Subframe 3 mainly contains the ephemeris (precise orbit information). The almanac (predicted orbit information) is transmitted as a part of Subframe 4 and Subframe 5.

The date and time (GPS time) counted in a GPS satellite does not reflect the deviation by leap seconds. Accordingly, there is a deviation between the GPS time and the UTC time, and it is required to convert the date and time acquired by receiving a radio signal from a GPS satellite into the UTC time before an output thereof. Further, to control the timing of receiving the radio signal from the GPS satellites based on the date and time counted in the time counter circuit 46 or to estimate the date and time to be acquired, it is required to convert the date and time of the time counter circuit 46 into the GPS time.

Next, acquisition of the date and time information in the electronic timepiece 1 according to this embodiment will be described.

As described above, when the deviation of the date and time (current date and time) counted in the electronic timepiece 1 is short compared to the length (6 seconds) of a subframe, the TOW-Counts and the subframe-IDs of the current subframe and the precedent and antecedent subframes and the WN of Subframe 1 can be estimated from the date and time. The electronic timepiece 1 of this embodiment generates an estimated bit array beforehand by using such assumable bits and sequentially compares a received bit with the estimated bits. The electronic timepiece 1 thereby acquires information on the correct date and time (date and time information) associated with the estimated bit array based on the deviation at which the received bits consecutively match the estimated bits. Further, when the estimated bit array includes a bit that varies in each subframe as described above, it is possible to prevent a false match determination even when the date and time counted in the time counter circuit 46 is deviated beyond an estimated range as described below.

In addition to the bit array that changes according to the date and time, the estimated bit array may further include a constant bit that remains the same regardless of the transmit cycle, such as the Preamble and the spare bit. Further, bits such as the alert flag and the anti-spoof flag that are normally "0" but become "1" when the usage is not recommended (flags that represent the transmission condition) may be added to the estimated bit array as being "0" although they are not assumable.

Furthermore, the last one or more bit arrays that are acquired from satellite radio signals and the received date and time (reception history) thereof may be stored in the storage section 63. From among the stored bit arrays, the part that is assumed to normally remain unchanged when only a short time has elapsed since the last reception although its change cannot be completely estimated, e.g. the telemetry message of Word 1, may be selected and used as the estimated bit array based on the position of the part in an navigation message (i.e. type of information). Alternatively, the estimated bit array may be a combination of a part or all of the telemetry message with a bit array that is constant or variable according to the transmission cycle. A determination whether such a bit array is usable as the estimated bit array may be made not only based on the elapsed time since the last reception but also an additional condition that the bit array has not changed in the last plural receptions.

Similarly, when data on the orbit of a positioning satellite such as almanac data has been already acquired and there still remains a time until the next update, such data may also be included in the estimated bit array.

The parity data that is arranged at the 25th to 30th bits of each word is calculated from the parity code at the 29th and 30th bits of the previous word and necessary bit data in the 1st to 24th bits of the current word. Accordingly, since it is difficult to estimate the parity codes at the 29th and 30th bits of the previous word, the estimated bit array does not include the parity data in the electronic timepiece 1 of this embodiment.

The estimated bit array is not necessarily continuous and may be composed of separate bit array segments. That is, the estimated bit array may be generated excluding the 6 bits of the parity data between the spare bit at the 23th bit of Word 1 and the TOW-count at the 1st to 17th bits of Word 2. By setting an estimation flag (identification information) to each bit, assumable bits that are included in the estimated bit array can be distinguished from unassumable bits that are excluded from the estimated bit array. The estimation flags may be generated when the estimated bit array is generated.

Regarding comparison between the estimated bit array and the received bit array, the bit array of the information actually transmitted from a GPS satellite is partly inverted every other word at the 1st to 24th bits (all bits except for the parity data) according to the last bit (30th bit) (inversion sign) of the parity data of the previous word. That is, when the inversion sign is "0", the 1st to 24th bits of the next word are transmitted according to the information without any change. When the inversion sign is "1", all of the 1st to 24th bits of the next word that represent the information are inverted. Accordingly, the number of estimated bit array(s) to be generated is actually not one but equal to the number of combinations of inversion of the words.

There is a phase (bit) deviation between the estimated bit array and the received bit array according to the deviation of the date and time of the time counter circuit 46. Since the rate of the time counter circuit 46 is 0.5 sec/day (1/48 sec/h) as described above, the highest possible value dt of the deviation (a half of the range of possible deviation) of the date and time counted in the time counter circuit 46 from the correct date and time is estimated to be dt=tp/48 according to the elapsed time tp (h) since the last correction of the date and time. That is, the correct date and time tc is estimated to be within the range of t−dt≤tc≤t+dt with respect to the date and time t counted in the time counter circuit 46.

The electronic timepiece 1 of this embodiment compares a received bit r(t) acquired on the date and time t counted in the time counter circuit 46 with each of the bits that are estimated to be within the range of t−dt≤tc≤t+dt. The electronic timepiece 1 then accumulates the comparison results for a plurality of date and times t as an array of components that are arranged according to deviation dc from the correct date and time so as to specify the deviation dc at which the bits perfectly match.

Figure 3A:
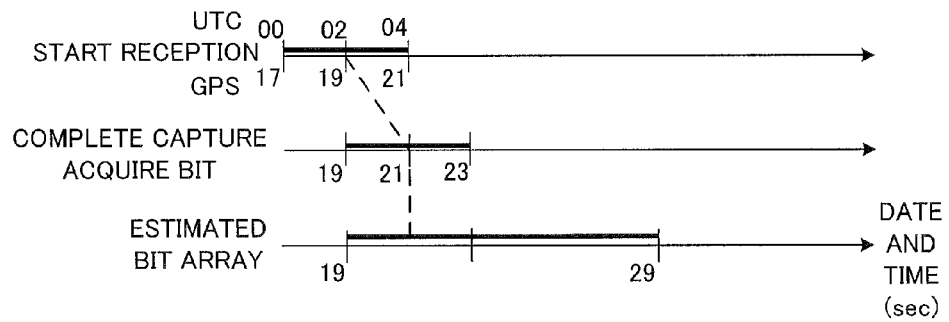
FIG. 3A illustrates comparison of bits in the electronic timepiece of the embodiment.
Figure 3B:
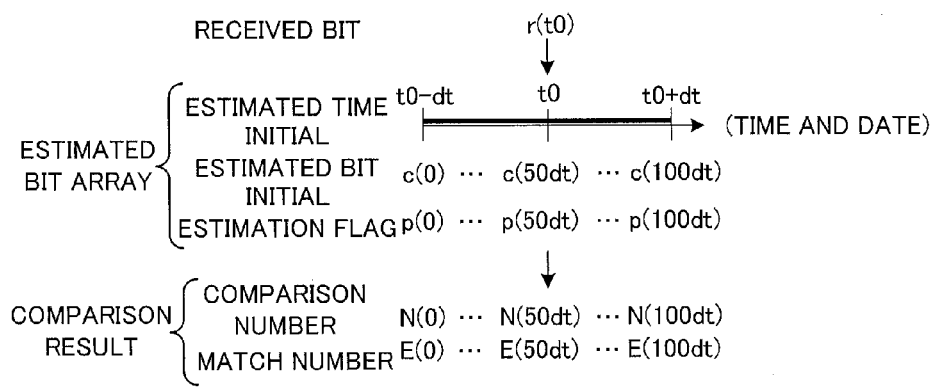
FIG. 3B illustrates comparison of bits in the electronic timepiece of the embodiment.
Figure 3C:
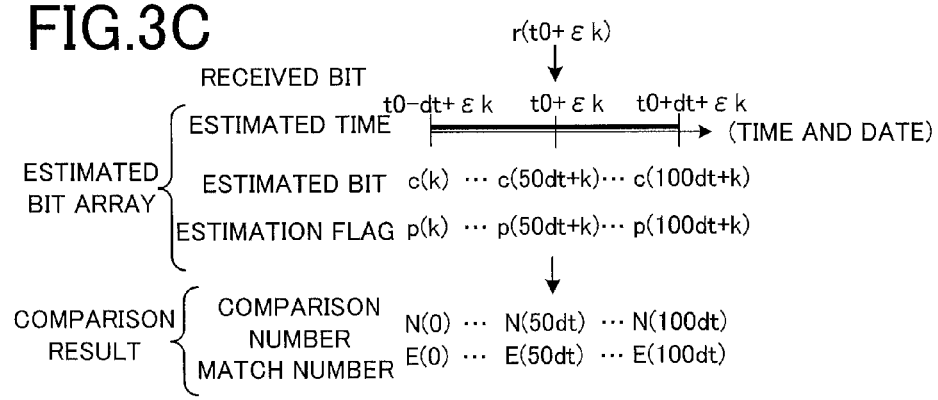
FIG. 3C illustrates comparison of bits in the electronic timepiece of the embodiment.

FIG. 3A to FIG. 3C illustrate the comparison of bits in the electronic timepiece 1 of this embodiment.

As illustrated in FIG. 3A, when a signal reception starts at certain o'clock certain minutes 02 seconds in the UTC time which is four days (96 hours) after the last correction of the date and time of the time counter circuit 46, the correct date and time tc is estimated to be within the range of from 00 second to 04 seconds. When the difference between the UTC time and the GPS time is 17 seconds, the correct time in the GPS time is estimated to be within the range of from 17 seconds to 21 seconds. Further, when it takes 2 seconds from the start of the signal reception to capturing a radio signal from a GPS satellite to the start of acquiring the bits, acquisition of the bits starts between 19 seconds and 23 seconds in the GPS time. In this case, the generated estimated bit array includes the bits within the range of from 19 seconds to 23 seconds in the GPS time and may additionally include the bits in the next 6 seconds (transmission cycle) within the range of from the 23 seconds to 29 seconds, which corresponds to the length of one subframe. Further, after the estimated bit array is generated, since the bits before 19 seconds are not necessary, only the estimated bit array starting from 19 seconds may be stored and held.

As illustrated in FIG. 3B, at first, a received bit $r(t0)$ on date and time t0 (19 seconds in this case) counted in the time counter circuit 46 is acquired. Then, 201 estimation flags $p(i)$ from the estimation flag $p(0)$ on date and time $t0-dt$ of the estimated bit array (17 seconds in this case) to the estimation flag $p(100dt)$ on date and time $t0+dt$ (21 seconds in this case) are referenced, and the received bit $r(t0)$ is compared with each of estimated bits $c(i)$ at indexes (i) with estimation flags $p(i)$ representing "estimation possible" (e.g. $p(i)=1$).

When an estimation flag $p(i)$ of a bit represents "estimation possible" and a comparison is made for the bit, "1" is added to the corresponding comparison number $N(i)$. In this embodiment, the estimation flag $p(i)$ is configured such that $p(i)=1$ when estimation is possible, and $p(i)=0$ when estimation is impossible, and the value of $p(i)$ is added to the comparison number $N(i)$. Further, when the result of a comparison is "match", "1" is added to the corresponding match number $E(i)$.

The above-described process is repeated every time a received bit is newly identified. Since the bits are transmitted from a GPS satellite at a rate of 50 bits per second, the process is repeated at intervals $\epsilon=20$ msec.

As illustrated in FIG. 3C, a count-up number k that increases by "1" every time a new bit is identified (i.e every time an interval $\epsilon$ has elapsed) is used so that the (k+1)-th received bit $r(t0+\epsilon k)$ is identified on a date and time $t0+\epsilon k$. At the same time, estimation flags $p(k)$ to $p(100dt+k)$, which correspond to the estimated bit array from the date and time $tc0-dt+\epsilon k$ to the date and time $t0+dt+\epsilon k$ of the estimated bit array, are referenced, and the values thereof are respectively added to $N(0)$ to $N(100dt)$. Further, the received bit $r(t0+\epsilon k)$ is compared with each of the assumable bits among the estimated bits $c(k)$ to $c(100dt+k)$, and when an estimated bit $c(i)$ at index (i) matches, the value of match number $E(i-k)$ at index (i-k) among match numbers $E(0)$ to $E(100dt)$ is increased by "1".

In an example of FIG. 3C, the index (i) of an estimation flag $p(i)$ and an estimated bit $c(i)$ is monotonically increased with time. However, the data of the first estimation flag $p(k)$ and the first estimated bit $c(k)$ that have been already compared can be erased since they will not be referenced later. In this case, among the referenced estimation flags $p(i)$ and the corresponding estimated bits $c(i)$, the values of $p(i)$ and $c(i)$ at index $(i) \geq 1$ ($1 \leq (i) \leq M$, M is the last index of the generated estimated bits and estimation flags) are shifted to $p(i-1)$ and $c(i-1)$ respectively by subtracting "1" from the indexes. Alternatively, in a loop with the predetermined maximum number of array (value imax, which is a sum of 100dt+1 and an additional predetermined margin), the values of a k-th newly generated estimation flag and an estimated bit (k being the count-up number) are assigned at index (i)=k mod imax (the reminder of count-up number k divided by integer imax) repeatedly.

Repeating the above-described process selectively increases the match number $E(i)$ that corresponds to the phase deviation (index (i)) where the estimated bit array matches the received bit array. Then, when the match number $E(i)$ reaches such a value that can make the probability of false identification sufficiently low, which is due to an accidental increase of the other match numbers E at different phase deviations, and the match number $E(i)$ is further equal to the comparison number $N(i)$, it means that the number of bits that completely match is equal to the value of $E(i)$ ($N(i)$). Then, the correct date and time are acquired based on the timing corresponding to the match number E.

A match number threshold Eth (comparison number threshold) for making a determination as to whether the probability of false identification is sufficiently low is selected based on, for example, the upper limit of the probability of false identification required for the electronic timepiece 1. The shorter the estimated bit array, the higher the probability of occurrence of the same bit array as the estimated bit array at an unexpected position, i.e. the probability of accordance with the received bit. Also, the longer the estimated bit array, the longer time the reception requires. In the electronic timepiece 1 of this embodiment, the probability of a binary bit being "0" or "1" is simplified to evenly ½, and standard values are set for the number of occurrence and the probability of accordance of the estimated bit array so that they are sufficiently low compared to the estimated number and frequency of receiving date and time data during the product life of the electronic timepiece 1. Based on these standard values, the length of the estimated bit array is selected.

That is, the probability of occurrence of a certain N-bit array is represented as $(½)^N$. Accordingly, the length of the bit array can be selected so that this probability becomes sufficiently low. For example, to maintain the probability of occurrence less than $10^{-8}$, N is set to $N \geq 27$. To maintain the probability of occurrence less than $10^{-6}$, N is set to $N \geq 20$. When the electronic timepiece 1 has a product life of 20 years and performs the signal reception six times a day, the estimated number of reception is 43830. When $N=20$, the probability of occurrence of at least one false identification during the product life is approximately 4.2%. When $N=27$, the probability is approximately 0.033%.

For this probability of occurrence, a standard value may be preset. Alternatively, the standard value may be selected directly or indirectly from different values based on a user input operation of setting on the operation section 49 (e.g. the different standard values may be associated with explanations such as "strict", "normal" and "tolerant").

FIG. 4 is a flowchart illustrating the control of date and time acquisition processing by the host CPU 41 in the electronic timepiece 1 of this embodiment.

The date and time acquisition processing starts when a user input operation of an execution command on the operation section 49 is detected or when a predetermined condition of reception time or reception timing is satisfied.

Once the date and time acquisition processing starts, the host CPU 41 activates the satellite radio signal receiving and processing section 60 (Step S101). Further, the host CPU 41 sends initial data to the satellite radio signal receiving and processing section 60, which includes a setting that the object to be acquired is the date and time information and also includes the date and time information counted in the time counter circuit 46 (Step S102). The date and time information includes information on the largest possible deviation that is estimated based on the elapsed time since the last correction of the date and time of the time counter circuit 46. Then, the host CPU 41 waits for a data output from the satellite radio signal receiving and processing section 60. During the waiting time, the host CPU 41 may display a screen image on the display section 47 showing that a radio signal is now being received.

The host CPU 41 waits for a signal from the satellite radio signal receiving and processing section 60 and then acquires the date and time data (Step S103). Thereafter, the host CPU 41 deactivates the satellite radio signal receiving and processing section 60 (Step S104) and corrects the date and time counted in the time counter circuit 46 (Step S105). Further, the host CPU 41 updates the reception history stored in the RAM 43 (Step S106). Then, the host CPU 41 terminates the date and time acquisition processing.

FIG. 5 is a flowchart illustrating the control of date and time information reception processing by the module CPU 61 in the electronic timepiece 1 of this embodiment.

The date and time information reception processing starts when the host CPU 41 activates the satellite radio signal receiving and processing section 60 and the object of acquisition output from the host CPU 41 in Step S102 is the date and time information.

Once the date and time information reception processing is started, the module CPU 61 performs an initialization such as acquisition and allocation of a memory area, and an operation check (Step S201). The module CPU 61 acquires the date and time information that was output from the host CPU 41 in Step S102, converts the acquired UTC time to the GPS time, and estimates the range of the correct date and time based on error information (Step S202).

The module CPU 61 generates an array of estimation flags p(i) and an estimated bit array c(i) that covers at least the estimated range of the correct date and time (Step S203). The module CPU 61 starts to receive a signal from GPS satellites (Step S204) and captures a receivable radio signal from a GPS satellite (Step S205). The module CPU 61 detects and captures the signal from the GPS satellite by an attempt to perform a reversed process of spread spectrum in which each C/A code of the GPS satellites is applied to the received radio signal at different phases.

Once the module CPU 61 captures the signal from the GPS satellite, it starts to identify each bit of the received data while tracking the captured GPS satellite at the captured phase (Step S206). Further, the module CPU 61 sets the count-up number k to the initial value "0". The module CPU 61 corrects the estimated bit array based on the deviation of the timing of generating the estimated bit array c(i) and the estimation flags p(i) in Step S203 from the timing of actually starting the identification of the bits (Step S207).

Every time one bit is identified, the module CPU 61 acquires the bit (Step S208). The module CPU 61 calls and executes pattern match processing (Step S209) and then calls and executes reliability determination processing (Step S210). The module CPU 61 makes a determination as to whether the reliability is OK based on the determination result obtained in the processing of Step S210 (Step S211). If it is determined that the reliability is NG (Step S211, No), the module CPU 61 makes a determination as to whether a time-out period has elapsed since the start of receiving the radio signal from the GPS satellite (Step S212). If it is determined that the time-out period has elapsed (Step S212, Yes), the control of the module CPU 61 proceeds to Step S216. If it is determined that the time-out period has not elapsed yet (Step S212, No), the module CPU 61 assigns the values of the estimated bit array c(i) and estimation flags p(i) at index (i)≥1 respectively to the estimated bit array c(i−1) and estimation flags p(i−1) so as to shift the array by 1 bit. Further, the module CPU 61 generates additional estimated bit array c(i) and an estimation flag p(i) according to need (Step S213). Then, the control of the module CPU 61 returns to Step S208.

In the determination of Step S211, if it is determined that the reliability is OK (Step S211, Yes), the module CPU 61 acquires the correct GPS date and time based on the reliable timing of the bit array and the date and time represented by the estimated bit array. Then, the module CPU 61 converts the acquired GPS time to the UTC time and sets a timing (Step S214). The module CPU 61 outputs the date and time information to the host CPU 41 at the set timing (Step S215). Then, the control of the module CPU 61 proceeds to Step S216.

Once the control proceeds to Step S216, the module CPU 61 terminates receiving the radio signal from the GPS satellite (Step S216). Then, the module CPU 61 terminates the date and time information reception processing.

FIG. 6 is a flowchart illustrating the control of the pattern match processing that is called in Step 209 of the date and time information reception processing.

Once the pattern match processing is called, the module CPU 61 adds "1" to the count-up number k (Step S801). The module CPU 61 sets the index (i) to the initial value "0" and sets the estimated bit c(i) as a bit for comparison (comparison bit) (Step S802).

The module CPU 61 references the estimation flag p(i) to make a determination as to whether the estimated bit c(i) is an assumable bit (Step S803). If it is determined that the estimated bit c(i) is unassumable (Step S803, No), the control of the module CPU 61 proceeds to Step S808.

If it is determined that the estimated bit c(i) is an assumable bit (Step S803, Yes), the module CPU 61 adds "1" to the comparison number N(i) (Step S804) and then makes a determination as to whether the acquired received bit "r" is the same as the comparison bit, i.e. the estimated bit c(i) (Step S806). If it is determined that they are not the same (Step S806, No), the control of the module CPU 61 proceeds to Step S808.

If it is determined that the received bit "r" is the same as the comparison bit (Step S806, Yes), the module CPU 61 adds "1" to the match number E(i) (Step S807). Then, the control of the module CPU 61 proceeds to Step S808.

Once the control proceeds to Step S808, the module CPU 61 makes a determination as to whether the index (i) is equal to or greater than 100dt (Step S808). That is, the module CPU 61 makes a determination as to whether the comparison is performed from the estimated bit c(0) to the estimated bit c(100dt). If it is determined that the index (i) is less than 100dt, i.e. the comparison is not complete all over the comparison targets (Step S808, No), the module CPU 61 adds "1" to the index (i) and sets the estimated bit c(i) as the comparison bit (Step S809). Then, the control of the module CPU 61 returns to Step S803. If it is determined that the index (i) is equal to or more than 100dt, i.e. the comparison is complete all over the comparison targets to the estimated bit c(100dt) (Step S808, Yes), the module CPU 61 terminates the pattern match processing, and the control returns to the date and time information reception processing.

FIG. 7 is a flowchart illustrating the reliability determination processing that is called in Step S210 of the date and time information reception processing.

Once the reliability determination processing is called, the module CPU 61 extracts the highest value from among the values of match numbers E(i) and set it as a maximum match number Emax (Step S901). The module CPU 61 makes a determination as to whether the maximum match number Emax is greater than the match number threshold Eth (26 in this embodiment) (i.e. whether the maximum match number Emax is equal to or greater than 27) (Step S902). If it is determined that the maximum match number Emax is not greater than the match number threshold Eth (Step S902, No), the control of the module CPU 61 proceeds to Step S906.

If it is determined that the match number Emax is greater than the match number threshold Eth (Step S902, Yes), the module CPU 61 fetches the value of the comparison number N(i) at index (i) corresponding to the maximum match number Emax (Step S903). The module CPU 61 makes a determination as to whether the maximum match number Emax is equal to the fetched value of the comparison number N(i) (Step S904). If it is determined that they are equal (Step S904, Yes), the module CPU 61 determines that the reliability is OK (Step S908) and terminates the reliability determination processing. Then, the control returns to the date and time information reception processing.

If it is determined that the maximum match number Emax is not equal to the value of the comparison number N(i) (Step S904, No), the module CPU 61 resets the match number E(i) corresponding to the maximum match number Emax and the fetched comparison number N(i) to "0". Then, the control proceeds to Step S906.

Once the control proceeds from Step S902 or Step S905 to Step S906, the module CPU 61 makes a determination as to whether the remainder of the count-up number k divided by 300 (i.e. the number of bits in one subframe) is "0" (Step S906). If it is determined that the remainder is "0" (Step S906, Yes), the module CPU 61 initializes all comparison numbers N(i) and match numbers E(i) at all indexes (i) to "0" (Step S907). Then, the module CPU 61 determines that the reliability is NG (Step S909). Then, the module CPU 61 terminates the reliability determination processing, and the control returns to the date and time information reception processing. If it is determined that the remainder is not "0" (Step S906, No), the control of the module CPU 61 proceeds to Step S909.

As described above, the satellite radio signal receiving and processing section 60 of this embodiment includes the module CPU 61 and the receiving section 67 (the RF section 64, the base band converting section 65, the capturing and tracking section 66) that receives and demodulates a radio signal from a positioning satellite to identify the received bits of the signal. As the comparing section 610, the module CPU 61 compares each identified received bit with the estimated bits that are estimated to be received within the possible deviation range set for the current date and time acquired from the time counter circuit 46 as the reception time of the received bit, so as to acquire information on the comparison results associated with the deviation from the current date and time. As the deviation detecting section 611, the module CPU 61 detects a deviation that satisfies a predetermined match condition of the comparison results for received bits. As the date and time acquiring section 613, the module CPU 61 acquires the date and time information based on the deviation that satisfies the match condition.

As a result, it becomes unnecessary to decode a radio signal to acquire the date and time information while receiving the radio signal. This simplifies the processing during the signal reception and therefore enables distributing the processing load and moderating the peak thereof. Further, it is possible to acquire the correct date and time information in a short time after starting the signal reception.

Further, as long as the deviation of the date and time counted in the time counter circuit 46 is within the estimated range, it is possible to eliminate the possibility of failing detection of a correct bit array due to a deviation of reception time from the subframe data. Therefore, the date and time information can be acquired readily and more securely regardless of the timing of starting the processing.

As the estimated bit array generating section 612, the module CPU 61 generates the estimated bit array that includes the estimated bits within the possible deviation range estimated from the date and time counted in the time counter circuit 46 and the estimation flags for distinguishing the estimated bits from non-estimated bits in the estimated bit array. Then, as the comparing section 610, the module CPU 61 compares the received bit with the comparable estimated bits that are selected based on the estimation flags.

In this way, the comparison is simply skipped for the incomparable bits included in the estimated bit array. Therefore, the deviation from the correct date and time can be detected by the simple loop processing. Further, the comparison is performed in parallel to deviations within the possible deviation range. Therefore, the processing is less likely to be affected by the timing of starting the reception.

As the comparing section 610, the module CPU 61 compares a received bit with estimated bits that are within the possible deviation range from the received date and time of the received bit every time the receiving section 67 (the RF section 64, the base band converting section 65 and the capturing and tracking section 66) identifies a new received bit. In this way, received bits are compared one by one in real time. Therefore, the deviation from the correct date and time can be detected without delay, and the current date and time can be output rapidly.

As the possible deviation range setting section 614, the module CPU 61 that includes the time counter circuit 46 counting the current date and time sets the possible deviation range based on the elapsed time since the last correction of the current date and time counted in the time counter circuit 46. Therefore, the possible deviation range can be set readily and suitably. Further, since the possible deviation range is not set wider than necessary, the processing load is not increased.

The deviation of the current date and time from the correct date and time is identified when the received bits match the respective estimated bits at the same deviation consecutively for the match number threshold Eth or more. In this way, the match number E(i) increases selectively at the index (i) that corresponds to the deviation to be identified. Therefore, the deviation can be identified readily and suitably.

Further, the match number threshold Eth is selected so that the probability that the received bits match the estimated bits consecutively for the match number threshold Eth is less than a predetermined threshold value, e.g. $10^{-8}$.

The standard value is selected according to the balance between the accuracy and product life required for electronic timepieces and the frequency of occurrence of a false identification. Therefore, the electronic timepiece 1 can maintain the correct date and time within a required accuracy readily and suitably.

Further, the match number threshold Eth is determined on the assumption that the probability of occurrence of each binary value is evenly ½ in each bit, i.e. the probability that a bit matches an estimated bit is ½ in each comparison. Therefore, the correct date and time can be acquired readily and rather precisely with a power consumption and an operation time according to the accuracy required for the electronic timepiece 1.

The electronic timepiece 1 of this embodiment includes the satellite radio signal receiving and processing section 60, the time counter circuit 46 that counts the current date and time, the host CPU 41, which serves as the date and time correcting section 410 that corrects the date and time counted in the time counter circuit 46 by using the date and time acquired from the satellite radio signal receiving and processing section 60 as the date and time acquiring section 613, the display section 47 that displays the date and time counted in the time counter circuit 46 and the like.

Accordingly, the electronic timepiece 1, which is strictly limited in power consumption, in particular a portable and light-weight electronic timepiece such as a wristtimepiece, can acquire the correct date and time with a suitable power consumption and a suitable operation time while reducing the processing load.

By using the above-described method of acquiring the date and time information by the module CPU 61, a satellite radio signal receiver capable of receiving a radio signal from a positioning satellite can acquire the date and time information readily, more reliably and efficiently.

The program 631 that performs the above-described processing to acquire the date and time information may be installed in a computer that includes the receiving section 67 (the RF section 64, the base band converting section 65 and the capturing and tracking section 66). By executing the program, an electronic device with the computer can acquire the date and time information readily, more reliably and efficiently.

Variation

Next, a variation of the date and time information reception processing executed in the electronic timepiece 1 will be described.

In the date and time information reception processing of this variation, when the received bit array is compared with the estimated bit array in such a manner, the reliability is determined as OK not only when the matching is perfect but also when a small number of errors are included in the extent in which the probability of false identification is sufficiently low. This enables acquiring the date and time information even when a radio signal from a positioning satellite has low intensity and low S/N ratio (SNR).

When the matching is imperfect, the electronic timepiece 1 of this variation makes a determination as to whether the probability of false identification is low according to a condition (mismatch tolerance condition) that is based on the probability of occurrence of the lowest number (lowest mismatch number) among the mismatch numbers (mismatch bit numbers) between the received bit array and the estimated bit array at different phase deviations and the probability of occurrence of the second lowest number (second lowest mismatch number) among the mismatch numbers. On the basis that the probability of occurrence of "0" or "1" in each bit is evenly ½, the probability of occurrence P can be represented as $P={}_NC_E/2^N$ by using the comparison number N and the mismatch number E. For example, when a 44-bit estimated bit array is compared, the probability of occurrence of a bit array with 3 bits of mismatch is ${}_{44}C_3/2^{44}=7.53\times10^{-10}$. When a 28-bit estimated bit array is compared, the probability of occurrence of a bit array with 1 bit of mismatch is ${}_{28}C_1/2^{28}=1.04\times10^{-7}$.

The lowest mismatch number is stochastically equivalent to the largest match number. Accordingly, there is no difference between the above-described processing and processing that is performed by using the probability of occurrence of the largest match number and the probability of occurrence of the second largest match number, and the two processing give the same result, which is described below.

Alternatively, the possibility of false identification may be eliminated by using only the probability of occurrence of the lowest mismatch number as described above. However, in imperfect matching, the probability that the actual received bit array accidentally includes a bit array similar to the estimated bit array is higher. Accordingly, it is preferred to set a condition that can eliminate occurrence of such similar bit arrays. For example, the TOW-Count can be nearly "0" (i.e. all bits of the TOW-Count are "0") or almost all bits of the TOW-Count can be "1". In these cases, an estimated bit array partly or fully composed of such a bit array matches the received bit array at the repetitive part even when there is a slight phase deviation between them. Further, the bit array of the TOW-Count or the like can have a periodic pattern (e.g. "0" and "1" are alternately arranged). In this case, the bit array matches when the phase deviation corresponds to the cycle. Accordingly, the mismatch number becomes lower in this case compared to normal cases with a phase deviation, and the probability of false identification due to a noise (radio signal intensity) or the like increases.

First, in the electronic timepiece 1, comparison is made for a subframe (300 bits) within the phase deviation range of the estimated bit array, which is determined according to the largest possible deviation of the date and time estimated based on the rate of the time counter circuit 46. Then, by using the lowest mismatch number Ebmin, which is the lowest number of mismatch within the set phase deviation range, and the second lowest mismatch number Ebmin2, which is the second lowest number of mismatch, the ratio of the probability of occurrence P1 of the lowest mismatch number Ebmin to the probability of occurrence P2 of the second lowest mismatch number Ebmin2 is calculated as a degree of risk Pd. When the degree of risk Pd=P1/P2 is equal to or less than a predetermined threshold (i.e. the ratio of the probability of occurrence P1 is equal to or less than a predetermined value with respect to the probability of occurrence P2), it is determined that the probability of false identification is sufficiently low. By using the probability of occurrence of the largest match number and the probability of occurrence of the second largest match number instead of the lowest mismatch number Ebmin and the second lowest mismatch mumber EBmin2, the identical result can be obtained.

The threshold Pm of the degree of risk Pd may be suitably selected according to the estimated number of reception during the product life and the required accuracy of the product. In this variation, for example, the threshold Pm is set to $Pm=10^{-8}$.

When changing the phase deviation of the estimated bit array does not increase the imperfect match number very much as in the above-described cases, the deviation may not be determined as the match timing even when the received bit array can perfectly match the estimated bit array (i.e. the mismatch number is "0"). To cope with the problem, when the mismatch number is "0", its probability of occurrence P0 is set to "0" for calculating the degree of risk Pd so that the degree of risk Pd can be equal to or less than the threshold Pm.

In the electronic timepiece 1 of this variation, when the reception condition determined according to the SNR is good, the normal reliability determination based on perfect matching is made. However, when the reception condition is not good, the above-described reliability determination based on imperfect matching is made which can avoid false identification. Further, when the reliability determination based on perfect matching does not give OK for a predetermined time (comparison time limit), e.g. 6 seconds corresponding to the length of one subframe, the method is switched to the reliability determination based on imperfect matching that can avoid false identification.

FIG. 8 is a flowchart illustrating the control of pattern match processing that is called in date and time information reception processing of this variation.

This pattern match processing is the same as the pattern match processing of the previously described embodiment of FIG. 6 except that Step S805 and Step S806a are further added, and Step S807 is replaced with Step S807a. Accordingly, detailed description for the same steps is omitted.

After the value of the comparison number N(i) is increased in Step S804, the module CPU 61 makes a determination as to whether the SNR (signal indicator) of the received radio signal around the timing of starting the bit identification is less than a predetermined intensity threshold Sth (Step S805). The intensity threshold Sth is selected according to a level at which false identification is likely to occur in the algorithm for identifying a binary code. For example, it is set to 30 dB or the like.

When the SNR is not less than the intensity threshold Sth (Step S805, No), the control of the module CPU 61 proceeds to Step S806. The module CPU 61 makes a determination as to whether the received bit "r" matches the estimated bits c(i) (Step S806). If it is determined that the bit matches (Step S806, Yes), the module CPU 61 adds "1" to a count-up value Eb (i) (Step S807a), and the control proceeds to step S808. If it is determined that the bit does not match (Step S806, No), the control of the module CPU 61 proceeds to Step S808.

In the determination of Step S805, if the SNR is less than the intensity threshold Sth (Step S805, Yes), the module CPU 61 makes a determination as to whether the received bit "r" does not match the estimated bits c(i) (Step S806a). If it is determined that the bit does not match (Step S806a, Yes), the control of the module CPU 61 proceeds to Step S807a. If it is determined that the bit matches (Step S806a, No), the control of the module CPU 61 proceeds to Step S808.

That is, when the initial SNR is equal to or greater than the intensity threshold Sth, the count-up value is increased according to detection of a match between the received bit "r" and the estimated bit c(i) as with the previous embodiment. In contrast, when the initial SNR is less than the intensity threshold Sth, the count-up value is increased according to detection of a mismatch between the received bit "r" and the estimated bits c(i).

Figure 10:
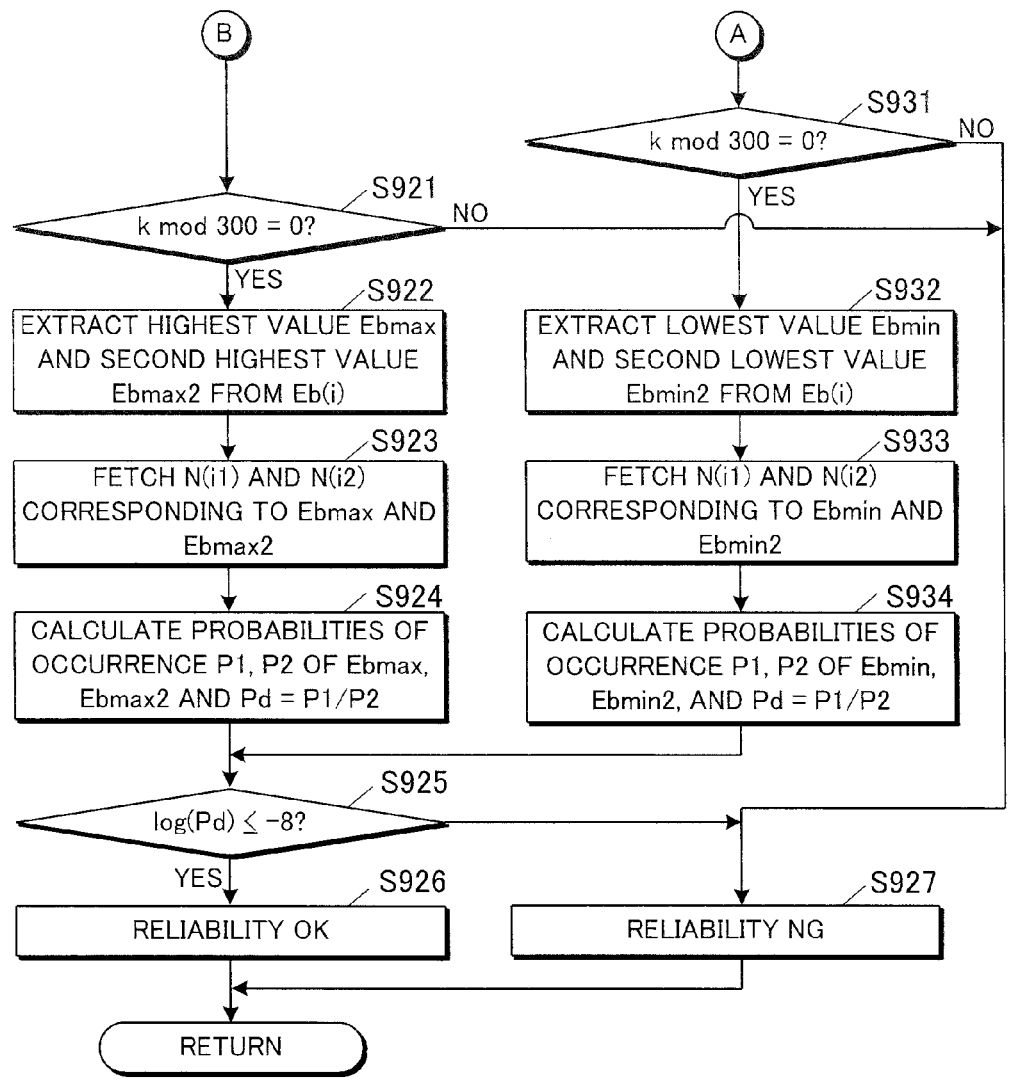
FIG. 10 is a flowchart of the control steps of reliability determination processing that is called in the date and time information reception processing of the variation.

FIG. 9 and FIG. 10 are flowcharts illustrating the control of reliability determination processing that is called in the date and time information reception processing of this variation. Compared to the reliability determination processing of FIG. 7, this reliability determination processing further involves Step S911, Step S912, Step S921 to Step S926 and Step S931 to Step S934 while it lacks Step S905 to Step S907. The other steps are the same, and the detailed description thereof is omitted.

Once the reliability determination processing is called, the module CPU 61 makes a determination as to whether the SNR in the first bit identification is less than the intensity threshold Sth (Step S911). If it is determined that the SNR is less than the intensity threshold Sth (Step S911, Yes), the control of the module CPU 61 proceeds to Step S931.

If it is determined that the SNR is not less than the intensity threshold Sth (Step S911, No), the module CPU 61 makes a determination as to whether the count-up number k is less than 300 (Step S912). If it is determined that the count-up number k is not less than 300 (Step S912, No), the control of the module CPU 61 proceeds to Step S921.

If it is determined that the count-up number k is less than 300 (Step S912, Yes), the control of the module CPU 61 proceeds to Step S901. Thereafter, if the control branches off to "No" in the determination of Step S902, or if the control branches off to "No" in the determination of Step S904, the control of the module CPU 61 proceeds to Step S909.

This variation does not involve Step S905 which resets the count-up value Eb(i) and the corresponding comparison number N(i) when the reliability is NG. Accordingly, the same count-up value Eb(i) may be extracted again as the maximum value Ebmax in Step S901 of the next reliability determination processing or later. That is, it is required that the count-up value Eb(i) at the correct phase is greater than the maximum value Ebmax, and this practically means that the match number threshold Eth is changed to a value greater than the initial value (27 in the variation).

If the control is branched off to "No" in the determination of Step S912, the module CPU 61 makes a determination as to whether the remainder of the count-up number k divided by 300 is "0" as illustrated in FIG. 10 (Step S921). If it is determined that the remainder is not "0" (Step S921, No), the module CPU 61 determines that the reliability is NG (Step S927) and terminates the reliability determination processing, and the control returns to the date and time information reception processing.

If it is determined that the remainder is "0" (Step S921, Yes), the module CPU 61 extracts the highest count-up value Ebmax and the second highest count-up value Ebmax2 from among the values of the obtained count-up values Eb(i) (Step S922). Further, the module CPU 61 fetches the values of the comparison numbers N(i1) and N(i2) that correspond to the count-up values Eb(i1) and Eb(i2) having the highest count-up value Ebmax and the second highest count-up value Ebmax2 (Step S923).

The module CPU 61 calculates the probability of occurrence P1 based on the highest count-up value Ebmax and the comparison number N(i1) and also calculates the probability of occurrence P2 based on the second highest count-up value Ebmax2 and the comparison number N(i2). The module CPU 61 calculates the degree of risk Pd=P1/P2 from these probabilities of occurrence P1 and P2 (Step 924). Then, the control of the module CPU 61 proceeds to Step S925.

If the control branches off to "Yes" in the determination of Step 911, the module CPU 61 makes a determination as to whether the remainder of the count-up number k divided by 300 is "0" (Step S931). If it is determined that the remainder is not "0" (Step S931, No), the module CPU 61 determines that the reliability is NG (Step S927) and terminates the reliability determination processing, and the control returns to the date and time information reception processing.

If it is determined that the remainder is "0" (Step S931, Yes), the module CPU 61 extracts the lowest count-up value Ebmin and the second lowest count-up value Ebmin2 from among the values of the obtained count-up values Eb(i) (Step S932). Further, the module CPU 61 fetches the comparison numbers N(i1) and N(i2) corresponding to the count-up values Eb(i1) and Eb (i2) having the lowest count-up value Ebmin and the second count-up value Ebmin2 (Step S933).

The module CPU 61 calculates the probability of occurrence P1 based on the lowest count-up value Ebmin and the comparison number N(i1) and also calculates the probability of occurrence P2 based on the second lowest count-up value Ebmin2 and the comparison number N(i2). The module CPU 61 calculates the degree of risk Pd=P1/P2 from these probabilities of occurrence P1, P2 (Step S934). Alternatively, the module CPU 61 may directly determines the degree of risk based on the calculation formula Pd=P1/P2 without individually determining the probabilities of occurrence P1, P2. Then, the control of the module CPU 61 proceeds to Step S925.

In Step S925, the module CPU 61 makes a determination as to whether the logarithm log(Pd) of the degree of risk Pd is equal to or less than −8 (Step S925). If it is determined that the logarithm is equal to or less than −8 (Step S925, Yes), the module CPU 61 determines that the reliability is OK (Step S926) and terminates the reliability determination processing. Then, the control returns to the data and time information reception processing. If it is determined that the logarithm is greater than −8 (Step S925, No), the module CPU 61 determines that the reliability is NG (Step S927) and terminates the reliability determination processing. Then, the control returns to the date and time information reception processing.

As described above, in the date and time information reception processing of this variation, a determination is made as to whether the number of mismatch bits in the comparisons between the received bits and the respective estimated bits at the same deviation satisfies the predetermined mismatch tolerance condition so that the probability of false identification of an unexpected bit array can be reduced to a low level. If the condition satisfies, the deviation that satisfies the predetermined mismatch tolerance condition is determined as the deviation from the correct date and time. Accordingly, even when the SNR is low due to the low radio signal intensity or a high noise and it is therefore difficult to correctly identify all received bits, the correct date and time information is likely to be acquired efficiently without drastically increasing the radio signal reception time. Therefore, an increase in power consumption can be reduced.

The capturing and tracking section 66 of the receiving section 67 obtains the SNR of a radio signal received from a positioning satellite at a predetermined timing such as at the start of the bit identification, and the module CPU 61 as the deviation detecting section 611 changes the threshold for determining the reliability of the acquired deviation as OK according to the obtained SNR. This can avoid unnecessarily extending reception time in a good reception condition or making a determination with too strict criteria in a bad reception condition. Therefore, the date and time information can be acquired flexibly and precisely.

When the SNR is equal to or greater than the predetermined threshold, the module CPU 61 as the deviation detecting section 611 determines that the reliability is OK according to the condition that the received bits match the respective estimated bits at the same deviation consecutively for the match number threshold Eth or more. When the SNR is less than the threshold, the module CPU 61 determines that the reliability is OK according to the condition that the ratio of mismatch bits in comparisons between the received bits and the respective estimated bits at the same deviation satisfies the above-described mismatch tolerance condition.

As a result, in a good reception condition, the date and time information can be acquired rapidly by the perfect match detection while in a less favorable reception condition, the imperfect match is enabled so that the date and time information can be acquired as long as the probability of false identification is sufficiently low. Therefore, the correct date and time information can be acquired with the reception time and power consumption that reflect the suitable determination criteria.

The S/N ratio (SNR) is used for making determination as to whether to acquire the date and time information by perfect matching. This enables selecting a suitable method for acquiring the date and time information readily and suitably according to the probability of occurrence of a false identification of the bits. Therefore, the date and time is acquired flexibly with the suitable power consumption and reception time as described above.

When the module CPU 61 as the comparing section 610 does not detect a deviation that satisfies the condition for determining the reliability as OK for the predetermined comparison time limit (e.g. 6 seconds, corresponding to the length of one subframe), it changes the predetermined match condition.

For example, when the reception condition is initially good but is then suddenly or temporary deteriorated due to interference by a building or the like, the perfect matching is (becomes) unsuitable for the detection. In such cases, the electronic timepiece 1 does not unnecessarily extend the reception time to make a determination according to the same determination condition, but flexibly changes the determination condition. Therefore, the correct date and time information can be acquired efficiently.

A predetermined times (in this variation, which is equal to the number of estimated bits in a cycle of subframe, i.e. 300 bits) of comparisons are made for each of the deviations within the possible deviation range from the date and time counted by the time counter circuit 46. In this process, when the ratio of the probability of occurrence P1 of the lowest mismatch bit number to the probability of occurrence P2 of the second lowest mismatch bit number is equal or less than the predetermined value, i.e. when the degree of risk Pd=P1/P2 is equal to or less than the predetermined threshold Pm, the mismatch tolerance condition is satisfied, which is used for making a determination as to whether the probability of a false identification due to an unexpected bit array is sufficiently low. Then, when the mismatch tolerance condition is satisfied, it is determined that the reliability is OK.

Accordingly, even when a received bit array contains a bit array that is actually likely to cause a false identification, the electronic timepiece 1 surely avoids confusion of such bit arrays that are likely to cause a misidentification with the correct bit array. Therefore, the correct date and time information can be acquired.

The probabilities of occurrence P1, P2 are determined based on the assumption that each binary value occurs evenly with a probability of ½ in all bits. This can avoid complicated calculation increasing the processing load and the required processing time. Therefore, the correct date and time information can be acquired while the probability of a false identification is estimated readily and almost accurately by simple processing.

The above-described reliability determination according to the number of mismatch bits is made every 6 seconds, which corresponds to the transmission cycle of a subframe of the navigation message of GPS satellites. Therefore, the determination of reliability can be made suitably such that the same number of comparisons are performed at each deviation regardless of the timing of starting the signal reception.

The present invention is not limited to the above-described embodiment and variation, and various changes can be made.

For example, in the above-described embodiment, the comparison is made for all of the bits within the possible deviation range from the current date and time until the reliability is determined as OK at any timing. However, the comparison for a bit at a clearly incorrect deviation, e.g. when its mismatch number is approximately equal to its match number, may be discontinued halfway.

In the above-described embodiment, every time a bit is identified, the comparison is performed for the identified bit. However, the present invention is not limited thereto. For example, the comparison may be performed at once after the number of identified bits reaches approximately the match number threshold Eth. Further, the comparison for the subsequent bits may also be performed at once after a predetermined plural number of bits are identified.

In the above-described embodiment, the possible deviation range has equal lengths at both sides from the counted date and time. However, when the deviation tend to occur toward one side, the possible deviation range may be set in consideration of the tendency. Further, not only the elapsed time since the last date and time correction, the possible deviation range may be determined also based on other factors such as temperature. On the contrary, the possible deviation range may be estimated by a simpler method. For example, the possible deviation range is uniformly set to ±3 seconds when the elapsed time since the last reception is equal to or less than 6 days.

In the above-described embodiment, the module CPU 61 performs the processing of counting the comparison number N(i) and the match number E(i). Instead, a logic circuit may be used for counting the comparison number N(i) and the match number E(i).

When the reliability is determined as OK only by the perfect matching in the above-described embodiment, Step S905 in FIG. 7 may be omitted as in the variation. Alternatively, the match number E(i) may be increased only when the received bits "r" consecutively matches estimated bit arrays, and the match number E(i) may be initialized to "0" when any one of received bits "r" does not match the corresponding comparison bit.

In this case, it is not required to count and hold the comparison number N(i).

In the above-described embodiment, when the reliability is not determined as OK at any index (i) after 300 bits, i.e. one subframe, is compared, the processing is reset or the method of the reliability determination is switched from one based on perfect matching to one considering false identification. However, the length is not limited to one subframe. For example, the method of the reliability determination may be switched when the comparison numbers N(i) reach a predetermined number, e.g. the match number threshold Eth, at all indexes (i).

Further, instead of the S/N ratio, other signal indicators such as reception intensity itself may be used for determining the reliability.

Alternatively, the method and the switch timing of the reliability determination may be selected manually according to a user input operation on the operation section 49. When the estimated bit array includes a bit that may not match the corresponding received bit, e.g. when it includes a telemetry message of the last received signal, the reliability determination may not be started with the method by perfect matching but with the method considering a false identification. In this case, an additional condition may be set that specifies the part where no false identification is allowed.

In the above-described embodiment, the possible deviation range is estimated based on the elapsed time since the last date and time correction by the satellite radio signal receiving and processing section 60. However, when another correction method is available, e.g. the date and time can be corrected also based on a standard time signal in the long-wavelength region, the possible deviation range may be estimated also based on the elapsed time since the last date and time correction by the alternative method.

In the reliability determination processing of the variation, the reliability determination by using the highest match number or the lowest mismatch number is made for every subframe cycle. However, when the comparison numbers N(i) reach a necessary value at all deviations, the reliability determination may be made before data on a cycle of subframe is acquired. In this case, the comparison numbers N(i) may not be the same at different deviations.

In the above-described embodiment, utilization of a radio signal received from a GPS satellite is described as an example. A radio signal from the other positioning satellites, e.g. a radio signal of the GLONASS or the Galileo, may also be used.

In the above-described embodiment, the radio signal reception from a GPS satellite is started immediately after Step S201 to Step S203 in the date and time information reception processing. However, when it is expected that there will be no assumable bit within the possible deviation range when the control proceeds to Step S206, the timing of starting Step S204 may be suitably adjusted.

In the above-described embodiment, the module CPU 61 of the satellite radio signal receiving and processing section 60 performs the processing of receiving a satellite radio signal and acquiring the date and time information based on the date and time counted in the time counter circuit 46. However, the present invention is not limited thereto. For example, the host CPU 41 may perform all or a part of the processing. That is, the comparing section 610, the deviation detecting section 611, the estimated bit array generating section 612, the date and time acquiring section 613 and the possible deviation range setting section 614 may be constituted by a single CPU or be respectively constituted by individual CPUs, or the host CPU 41 may serve as these sections.

The processing by a processor is not limited to those by the host CPU 41 and the module CPU 61, and dedicated hardware such as a logic circuit may partly or fully perform the processing.

Further, the satellite radio signal receiving and processing section 60 may independently include a time counter circuit, an RTC (real time clock) and the like (hereinafter referred to as time counter circuit etc.). The time counter circuit etc. may always perform a counting operation independently from switching of power supply to the satellite radio signal receiving and processing section 60 or may acquire information from the time counter circuit 46 at every start-up. In this case, every time the date and time information is acquired from the time counter circuit 46 of the electronic timepiece 1, the date and time counted by the time counter circuit etc. may be synchronized with the acquired date and time. Further, when the date and time counted in the time counter circuit 46 is corrected, the timing is set as the correction time of the date and time counted in the time counter circuit etc.

Further, the electronic timepiece 1 may be configured such that the date and time counted in the time counter circuit 46 can be shared by the host CPU 41 and the module CPU 61.

In the above-described embodiment, the probability of occurrence of each value of a bit is assumed to be evenly ½. However, the present invention is not limited thereto. The probability of occurrence may be changed according to the estimated position of a bit or the reception condition in the last reception.

The application of the satellite radio signal receiver of the embodiment is not limited to dedicated electronic timepieces. It may be applied to electronic equipment for various purposes.

In the above description, the storage section 63 of a non-volatile memory is described as an example of the computer-readable medium that stores programs for the processing of the module CPU 61 of the present invention such as the date and time information reception processing. However, the present invention is not limited thereto. The computer-readable medium may be an HDD (hard disk drive), a portable recording medium such as a CD-ROM and a DVD disk, or the like. Further, the present invention also encompasses a carrier wave for distributing the program of the present invention through a communication line.

A suitable change may be made in the specific configurations, the details and the processing steps and the like described in the above-described embodiment without departing from the spirit of the present invention.

While some embodiments of the present invention are described, the scope of the present invention is not limited to the above-described embodiment but encompasses the scope of the invention recited in the claims and the scope of the equivalents thereof.

The invention claimed is:

1. A satellite radio signal receiver, comprising:
    a receiving section which receives a radio signal from a satellite and demodulates the signal to identify each received bit of the signal; and
    a processor;
    wherein the processor compares the identified received bit with estimated bits which are estimated to be received within a possible deviation range set for a current date and time acquired as a reception time of the received bit, so as to obtain information on comparison result in relation to a deviation from the current date and time,
    wherein the processor detects the deviation which satisfies a predetermined match condition of comparison results for received bits, and
    wherein the processor acquires date and time information based on the detected deviation which satisfies the predetermined match condition.

2. The satellite radio signal receiver according to claim 1,
    wherein the processor generates an estimated bit array which includes the estimated bits within the possible deviation range and identification information which distinguishes the estimated bits from a non-estimated bit in the estimated bit array, and
    wherein the processor compares the received bit with the estimated bits based on the identification information.

3. The satellite radio signal receiver according to claim 1, wherein every time the receiving section identifies a new received bit, the processor compares the new received bit with estimated bits that are within the possible deviation range from a received date and time of the new received bit.

4. The satellite radio signal receiver according to claim 1, further comprising:
    a time counting section which counts the current date and time,
    wherein the processor selects the possible deviation range based on an elapsed time since a last correction of the current date and time counted in the time counting section.

5. The satellite radio signal receiver according to claim 2, further comprising:
    a time counting section which counts the current date and time,
    wherein the processor selects the possible deviation range based on an elapsed time since a last correction of the current date and time counted in the time counting section.

6. The satellite radio signal receiver according to claim 3, further comprising:
    a time counting section which counts the current date and time,
    wherein the processor selects the possible deviation range based on an elapsed time since a last correction of the current date and time counted in the time counting section.

7. The satellite radio signal receiver according to claim 1, wherein the predetermined match condition is satisfied when a mismatch bit number with respect to a comparison number in comparisons between the received bits and respective estimated bits at a same deviation satisfies a predetermined mismatch tolerance condition.

8. The satellite radio signal receiver according to claim 1, wherein the predetermined match condition is satisfied when the received bits match respective estimated bits at a same deviation consecutively for a predetermined comparison number threshold or more.

9. The satellite radio signal receiver according to claim 8, wherein the predetermined comparison number threshold is set so that a match probability that the received bits match the respective estimated bits consecutively for the predetermined comparison number threshold is less than a predetermined threshold value.

10. The satellite radio signal receiver according to claim 9, wherein the match probability is determined on the assumption that a match probability in each comparison is ½.

11. The satellite radio signal receiver according to claim 1,
    wherein the receiving section acquires a signal indicator at a predetermined timing, the signal indicator indicating an signal intensity of the radio signal received from the satellite, and
    wherein the processor changes the predetermined match condition according to the signal indicator.

12. The satellite radio signal receiver according to claim 11, wherein the processor selects the match condition such that:
    when the signal indicator exhibits such a good value that indicates the signal intensity is equal to or greater than a predetermined intensity threshold, the predetermined match condition is satisfied when the received bits match respective estimated bits at a same deviation consecutively for a predetermined comparison number threshold or more, and
    when the signal indicator exhibits such a poor value that indicates the signal intensity is less than the predetermined intensity threshold, the predetermined match condition is satisfied when a mismatch bit number with respect to a comparison number in comparisons between the received bits and respective estimated bits at a same deviation satisfies a predetermined mismatch tolerance condition.

13. The satellite radio signal receiver according to claim 11, wherein the signal indicator is S/N ratio.

14. The satellite radio signal receiver according to claim 1, wherein the processor changes the predetermined match condition when no deviation that satisfies the predetermined match condition is detected within a predetermined comparison time limit.

15. The satellite radio signal receiver according to claim 7, wherein the predetermined mismatch tolerance condition is satisfied when a ratio of a probability of occurrence of a lowest mismatch bit number to a probability of occurrence of a second lowest mismatch bit number is equal to or less than a predetermined value in comparisons that are performed for a predetermined times with respect to each of deviations within the possible deviation range.

16. The satellite radio signal receiver according to claim 15, wherein the probability of occurrence of the lowest mismatch bit number and the probability of occurrence of the second lowest mismatch bit number are determined on assumption that each binary value occurs evenly with a probability of ½ in all bits.

17. The satellite radio signal receiver according to claim 7, wherein determination as to whether the predetermined mismatch tolerance condition is satisfied is made every predetermined transmission cycle of a bit array that is transmitted according to a signal transmission format of the satellite.

18. An electronic timepiece, comprising:
the satellite radio signal receiver according to claim 1;
a time counting section which counts a current date and time;
an electronic timepiece processor which corrects the date and time counted in the time counting section by using the date and time information acquired by the processor; and
a display section which displays the date and time counted in the time counter section.

19. A method of acquiring date and time information in a satellite radio signal receiver which comprises a receiving section which receives a radio signal from a satellite and demodulates the signal to identify each received bit of the signal, comprising the steps of:

a comparison step of comparing the identified received bit with estimated bits which are estimated to be received within a possible deviation range estimated from a current date and time acquired as a reception time of the received bit, so as to obtain information on comparison result in relation to a deviation from the current date and time;
a deviation detecting step of detecting the deviation which satisfies a predetermined match condition of comparison results for received bits; and
a date and time acquiring step of acquiring date and time information based on the detected deviation which satisfies the predetermined match condition.

20. A recording medium storing a program that is readable by a computer of a satellite radio signal receiver which comprises a receiving section which receives a radio signal from a satellite and demodulates the signal to identify each received bit of the signal, the program making the computer function as:
a comparing section for comparing the identified received bit with estimated bits which are estimated to be received within a possible deviation range estimated from a current date and time acquired as a reception time of the received bit, so as to obtain information on comparison result in relation to a deviation from the current date and time;
a deviation detecting section for detecting the deviation which satisfies a predetermined match condition of comparison results for received bits; and
a date and time acquiring section for acquiring date and time information based on the detected deviation which satisfies the predetermined match condition.

* * * * *